United States Patent
Tauchi

(10) Patent No.: US 7,215,254 B2
(45) Date of Patent: May 8, 2007

(54) DRIVING ASSISTANCE SYSTEM

(75) Inventor: Nobutaka Tauchi, Toyoake (JP)

(73) Assignee: DENSO Corporation, Kariya (JP)

( * ) Notice: Subject to any disclaimer, the term of this patent is extended or adjusted under 35 U.S.C. 154(b) by 210 days.

(21) Appl. No.: 11/105,521

(22) Filed: Apr. 14, 2005

(65) Prior Publication Data

US 2005/0231340 A1    Oct. 20, 2005

(30) Foreign Application Priority Data

Apr. 16, 2004  (JP) .............................. 2004-121745
Feb. 28, 2005  (JP) .............................. 2005-530631

(51) Int. Cl.
  B60Q 1/00    (2006.01)
  G08G 1/00    (2006.01)
  G08G 1/123   (2006.01)
  H04N 7/18    (2006.01)
  G01C 21/00   (2006.01)
  G06G 7/78    (2006.01)

(52) U.S. Cl. ...................... 340/903; 340/435; 340/436; 340/901; 340/988; 340/990; 340/995.1; 348/143; 348/148; 348/149; 701/213; 701/300; 701/301; 701/302

(58) Field of Classification Search ........ 340/435–436, 340/901–903, 988, 995.1; 348/143, 148–149; 701/213, 300–302
See application file for complete search history.

(56) References Cited

U.S. PATENT DOCUMENTS 5,546,311 A      8/1996   Sekine
6,046,688 A *    4/2000   Higashikata et al. ... 340/995.27
6,246,932 B1     6/2001   Kageyama et al.
6,411,898 B2 *   6/2002   Ishida et al. ................. 701/211
6,535,242 B1 *   3/2003   Strumolo et al. ........... 348/148
6,625,540 B2 *   9/2003   Kageyama .................. 701/301
6,734,787 B2 *   5/2004   Ikeda ....................... 340/425.5
6,944,538 B2 *   9/2005   Ishibashi et al. ............ 701/209
7,102,537 B2 *   9/2006   Inoue et al. ................. 340/903
2002/0135467 A1  9/2002   Koike
2003/0006889 A1  1/2003   Koike
2003/0009275 A1  1/2003   Koike

FOREIGN PATENT DOCUMENTS

| JP | A-H04-290200 | 10/1992 |
| JP | A-H11-83508  | 3/1999  |
| JP | A-H11-259798 | 9/1999  |
| JP | A-2000-67367 | 3/2000  |
| JP | A-2000-264207| 9/2000  |
| JP | A-2004-245610| 9/2004  |

* cited by examiner

*Primary Examiner*—Daniel Wu
*Assistant Examiner*—Lam Pham
(74) *Attorney, Agent, or Firm*—Posz Law Group, PLC

(57) ABSTRACT

When a driving assistance system of a navigation device in a subject vehicle is able to communicate with a cooperative remote driving assistance system in an oncoming vehicle, images are obtained from individual front monitor cameras of the subject vehicle and the oncoming vehicle. These obtained images are exchanged. From within these images, common objects are recognized to thereby compute a positional relationship between the subject vehicle and the oncoming vehicle. The computed positional relationship is then shown in a display unit by a vehicular model using an outline of a top view of a vehicle. Consequently, a driver can intuitively recognize the positional relationship between the subject vehicle and the oncoming vehicle by seeing the display unit.

27 Claims, 14 Drawing Sheets

DRIVING ASSISTANCE SYSTEM

CROSS REFERENCE TO RELATED APPLICATIONS

This application is based on and incorporates herein by reference Japanese Patent Applications No. 2004-121745 filed on Apr. 16, 2004 and No. 2005-53031 filed on Feb. 28, 2005.

FIELD OF THE INVENTION

The present invention relates to a driving assistance system for assisting a driver to drive a vehicle.

BACKGROUND OF THE INVENTION

There is known a vehicular collision warning device that warns a driver when a collision risk is present so as to prevent a collision at an intersection with a vehicle outside a viewing field of a driver. (Refer to Patent Document 1.) In this device, a traveling direction detecting unit obtains a traveling direction, a speed detecting unit detects a speed, and a current position detecting unit detects a current position. Further, a communications control unit, a receiving unit, and a transmitting unit exchanges traveling directions, traveling speeds, and current positions between the subject vehicle and its neighboring vehicles. Through exchanging them, a computing unit determines whether an intersection is located within the distance D in the advancing direction. When an intersection is determined to be located within a distance D, the computing unit then determines whether any one of the neighboring vehicles approaches the intersection. When any one of the neighboring vehicles is determined to be approaching the intersection, a driver is warned of existence of the vehicle approaching the intersection through a displaying unit or a buzzer.

Patent Document 1: JP-H4-290200 A

Further, there are other positions where the subject vehicle may collide with or contact another vehicle, in addition to the intersection. For instance, when a vehicle passes an oncoming vehicle in a narrow road or when a subject vehicle is parked, there is possibility of colliding with another vehicle. In particular, suppose a case that a following vehicle is present when a subject vehicle passes an oncoming vehicle. In this case, a driver feels impatient to thereby not properly judge, so the driver may cause the subject vehicle to contact the oncoming vehicle or structures along roads or to run off road sides.

SUMMARY OF THE INVENTION

It is an object of the present invention to provide a driving assistance system that notifies a driver of proper information when a subject vehicle approaches and passes an oncoming vehicle to thereby enable safe passing of the oncoming vehicle.

To achieve the above object, a driving assistance system that is provided in a subject vehicle and communicates with at least one of remote driving assistance systems is provided with the following. A communicating unit is included for communicating with a given remote driving assistance system provided in a given vehicle. An obtaining unit is included for obtaining vehicle-related information relating to at least one of the subject vehicle and the given vehicle. A displaying unit is included for displaying various information. Further, a controlling unit is included. This controlling unit sends the obtained vehicle-related information via the communicating unit to the given remote driving assistance system, receives comparable vehicle-related information via the communicating unit from the given remote driving assistance system, and causes the displaying unit to display a positional relationship between related vehicles relating to the vehicle-related information and the comparable vehicle-related information, using a vehicular model that includes shapes of the related vehicles, based on the vehicle-related information and the comparable vehicle-related information, while the subject vehicle approaches and passes the given vehicle.

In this structure, since the driver can intuitively recognize a positional relationship with an oncoming vehicle that is to be passed by the subject vehicle by seeing the display unit. As a result, this helps prevent collision or contact with the oncoming vehicle or with structures along road sides, or the subject vehicle from running off the road sides.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

Figure 1:
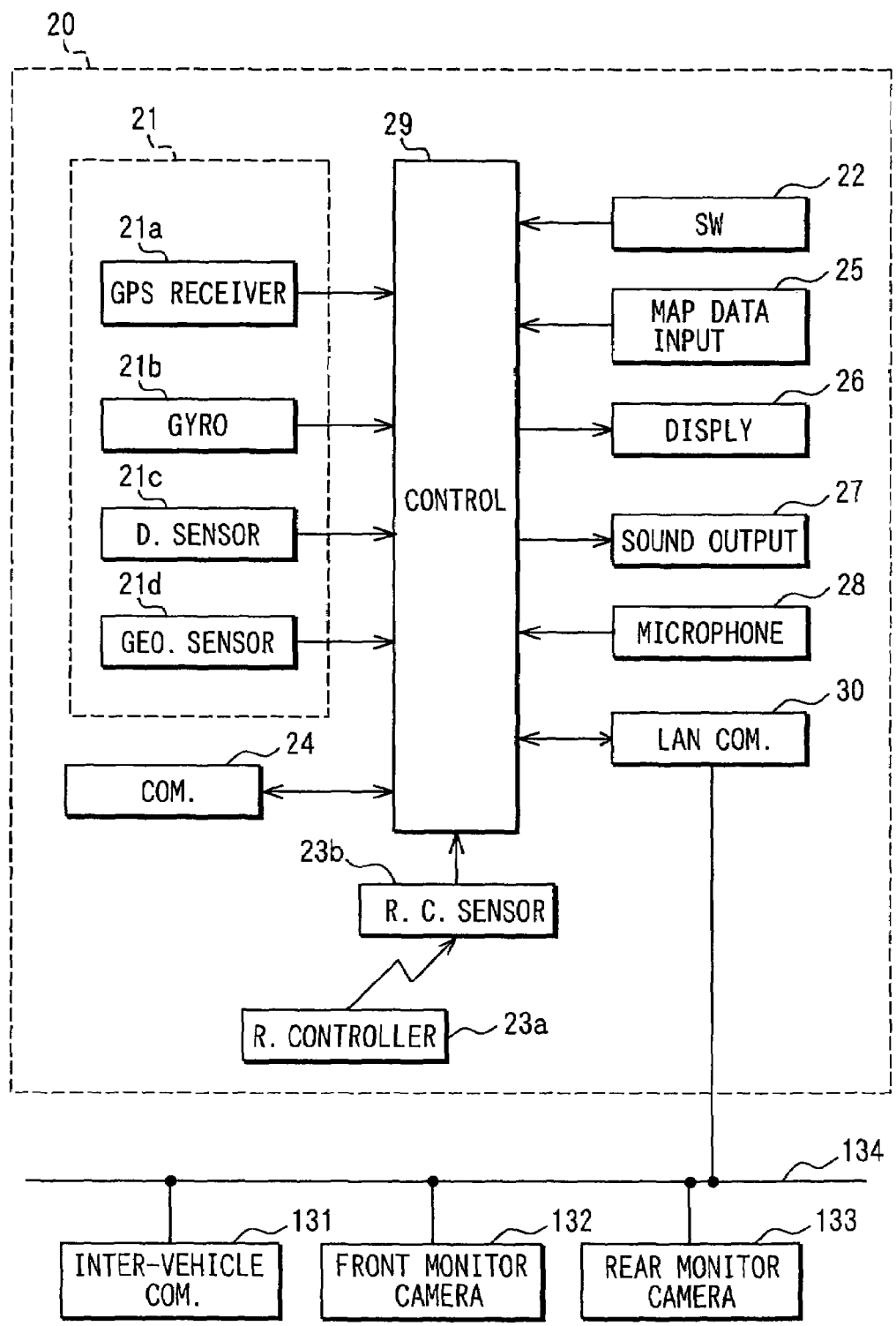
FIG. 1 is a block diagram of a schematic structure of a navigation device and other devices according to an embodiment of the present invention.

A driving assistance system according to an embodiment of the present invention will be explained below. As shown in FIG. 1, a function of the driving assistance system is included in a navigation device 20, an inter-vehicle communications device 131, a front monitor camera 132, and a rear monitor camera 133.

The navigation device 20 is mounted in a subject vehicle and includes the following: a position detector 21 for detecting a current position of the vehicle, an operating switch group 22 for inputting various instructions from a user or a driver, a remote controller 23a for inputting various instructions like the operating switch group 22, a remote controller sensor 23b for inputting signals from the remote controller 23a, an outside communications unit 24 for communicating with the outside by connecting to a packet communications network, a map data input unit 25 for inputting map data or the like from a map storage medium storing map data or various information, a display unit 26 for displaying maps or various information, a sound outputting unit 27 for outputting various guiding sounds, a microphone 28 for outputting electric signals based on speeches uttered by the user, an in-vehicle local area network (in-vehicle LAN) communications unit 30 for communicating various information with other devices via the in-vehicle LAN 134, and a control unit 29. This control unit 29 executes various processes according to inputs from the position detector 21, the operating switch group 22, the remote controller sensor 23b, the map data input unit 25, the microphone 28, and the in-vehicle LAN communications unit 30, and controls the display unit 26, the sound outputting unit 27, and the in-vehicle LAN communications unit 30.

Further, the position detector 21 includes the following: a GPS (Global Positioning System) receiver 21a for receiving radio-waves from GPS satellites via a GPS antenna (not shown), a gyroscope 21b for detecting rotational movement applied on the vehicle, a distance sensor 21c for detecting a traveling distance from acceleration in the advancing direction, and a geomagnetic sensor 21d for detecting an advancing direction from earth magnetism. Based on output signals from the foregoing sensors or the like 21a to 21d, the control unit 29 computes a position, an orientation, a speed, or the like of the vehicle. A position computation based on output signals from the GPS receiver 21a can be either a single positioning method or relative positioning method (D-GPS method, Interference positioning method). In particular, of the Interference positioning method, RTK-GPS (Real-Time Kinematics Global Positioning System) is favorable.

The operating switch group 22 consists of a touch panel integrated to a screen of the display unit 26 and mechanical switches disposed along the periphery of the display unit 26. Here, the touch panel and the display unit 26 are laminated as a unit. The touch panel can be a pressure-sensitive type, an electromagnetic-induction type, an electrostatic capacity type, or any combination of the foregoing types.

The outside communications unit 24 communicates by connecting to a packet communications network. In detail, when RTK-GPS is used, the outside communications unit 24 communicates with a base station of GPS.

The map data input device 25 is used for inputting various data stored in a map storage medium (not shown). The map storage medium includes the following: map data (node data, link data, cost data, road data (road width data, road side data, road ditch data, road side wall data or the like), topography data, mark data, intersection data, facility data, or the like). This map data storage medium can include a CD-ROM, a DVD-ROM, a hard disk, a memory card, or the like.

The display unit 26 is a color display and can be a liquid crystal display, an organic electroluminescence (EL) display, or a CRT. The display unit 26 shows a map and additional data on its screen with data overlapped with each other. The additional data include a mark indicating a current position, a guiding route to a destination, names, landmarks, or facilities mark. Further, guidance for facilities can be also shown. The mark indicating a current position is designated from a current position detected by the position detector 21 and map data inputted by the map data input unit 25.

The sound outputting unit 27 can output speeches for guidance of facilities inputted from the map data input unit 25 or various assistances. The microphone 28 outputs electric signals (sound signals) to the control unit 29 based on inputted speeches when a user inputs or utters speeches. The user can operate the navigation device 20 by inputting various speeches to the microphone 28.

The in-vehicle LAN communications unit 30 communicates with various devices (e.g., inter-vehicle communications device 131, an engine ECU (not shown)) via the in-vehicle LAN 134.

The control unit 29 mainly includes a micro-computer consisting of a CPU, a ROM, a RAM, an I/O, and a bus line connecting the foregoing components. The control unit 29 executes various processes based on programs stored in the ROM or the RAM. For instance, in a displaying process, a vehicle's current position is computed as a pair of coordinates and an advancing direction based on individual detection signals from the position detector 21; then, a map surrounding the current position is read via the map data input unit 25 and displayed on the display unit 26. Further, in a route computing process, an optimum route from a current position to a destination is computed based on map data stored in the map data input unit 25 and the destination set by the operating switch group 22 or the remote controller 23a. Furthermore, in a route guiding process, the computed optimum route is shown in the display unit 26 or outputted as speeches to the sound outputting unit 27 to be thereby used for route guiding.

The navigation device 20 connects to the inter-vehicle communications device 131, the front monitor camera 132, and the rear monitor camera 133. The inter-vehicle communications device 131 communicates with a cooperative remote inter-vehicle communications device mounted in another vehicle, e.g., an opponent vehicle, an oncoming vehicle, or a following vehicle, by using a short range wireless communications (e.g., Bluetooth (trade mark), or IEEE 802.11b). Consequently, this navigation device 20 can communicate with another comparable navigation system mounted in another vehicle.

The front monitor camera 132 is disposed in the front of the vehicle (e.g., at the rear of a rearview mirror, or at a front grille) for mainly photographing oncoming vehicles. The rear monitor camera 133 is in the rear of the vehicle (e.g., a round a rear window) for mainly photographing following vehicles.

Next, processes that are executed by the control unit 29 and related to the present invention will be explained below.

Figure 2:
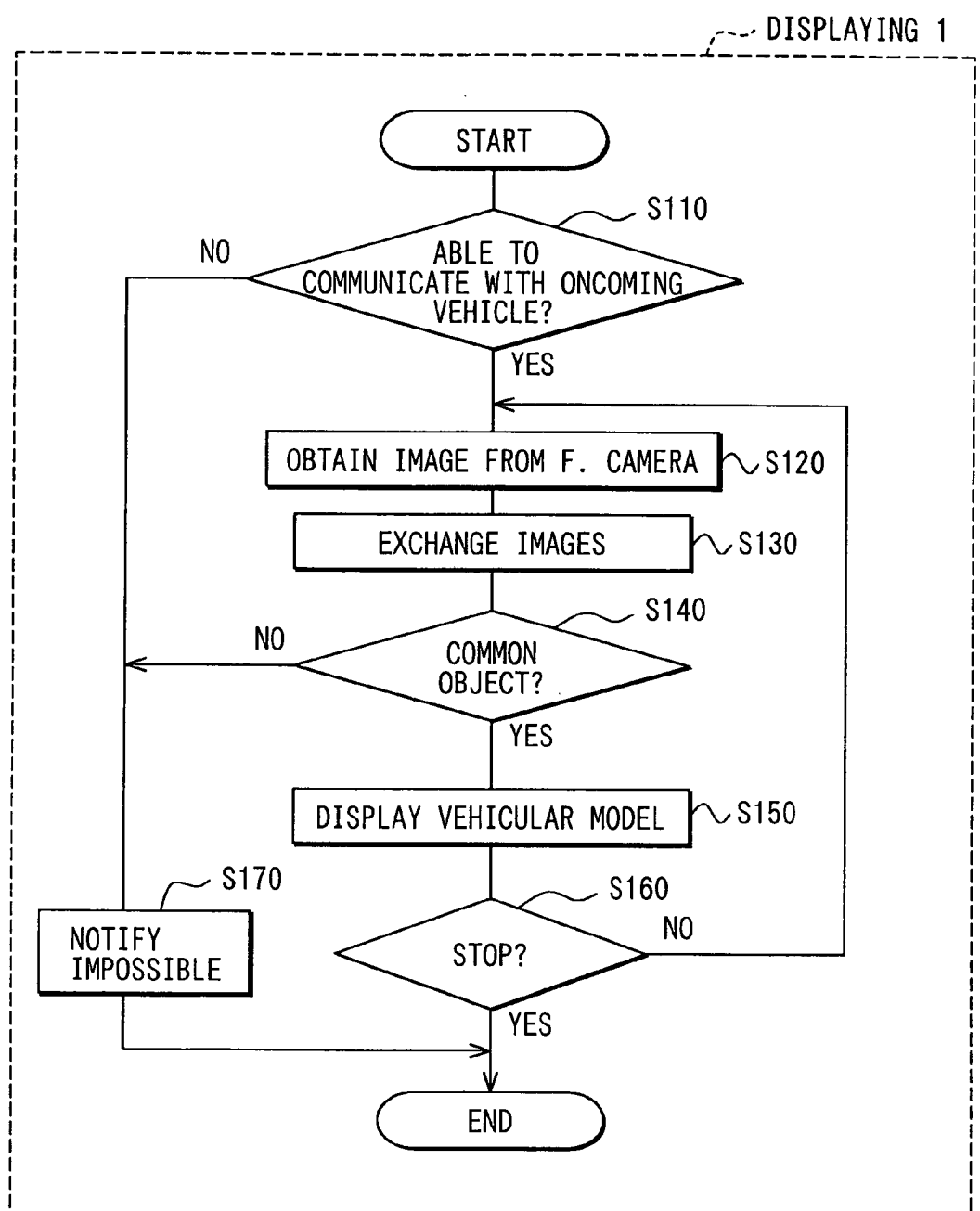
FIG. 2 is a flowchart diagram of a displaying process 1.

1) Displaying Process 1 (Refer to FIG. 2)

A displaying process 1 is started by the control unit 29 when a driver instructs by operating the operating switch group 22 or the remote controller 23a.

At Step S110, it is determined whether communicating with an oncoming vehicle as an opponent vehicle is possible. This step determines whether the control unit 29 in the navigation device 20 is able to communicate with a comparable navigation device mounted in an oncoming vehicle via the inter-vehicle communications device 131 in the subject vehicle. When communication with an oncoming vehicle is possible, the sequence goes to Step S120. When impossible, the sequence goes to Step S170.

At Step S120, an image is obtained from the front monitor camera 132. At Step S130, images are exchanged with the oncoming vehicle. Namely, this obtained image is sent to the oncoming vehicle via the inter-vehicle communications device 131, while a comparable image that is obtained from a front monitor camera provided in the oncoming vehicle is received from the oncoming vehicle.

At Step S140, it is determined whether a common object is present in both of the image obtained from the front monitor camera 132 and the image sent from the oncoming vehicle. Here, the common object can be a bumper of the subject vehicle or the like. When the common object is determined to be present, the sequence goes to Step S150. When the common object is determined to be not present, the sequence goes to Step S170.

Figure 8:
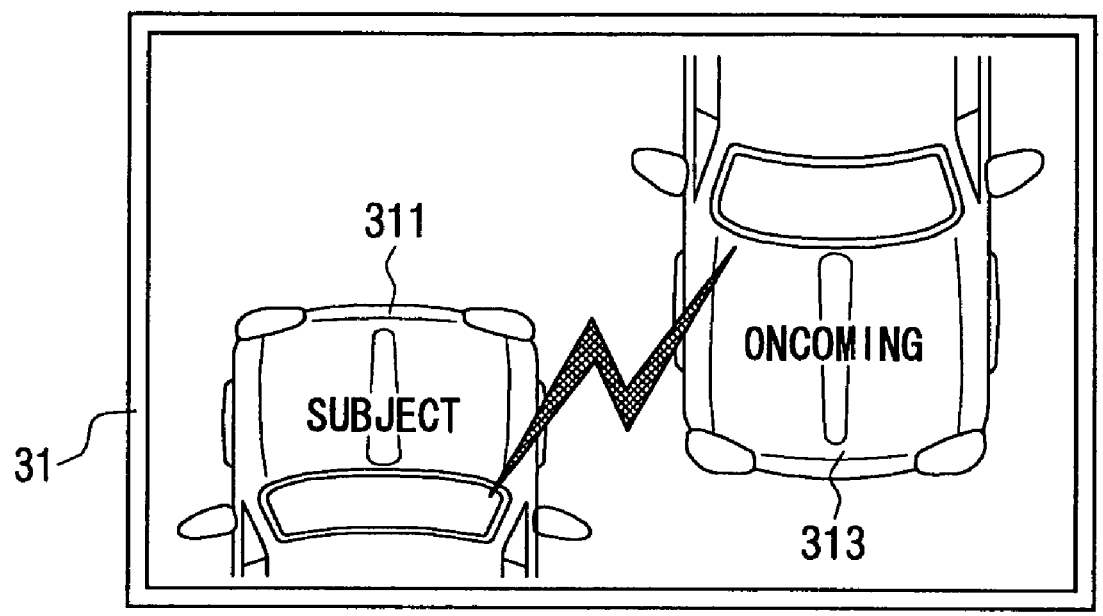
FIG. 8 is an example of a screen view shown in a display unit.

At Step S150, a positional relationship between the subject vehicle and the oncoming vehicle is computed based on the common object and then the computed positional relationship is shown in the display unit 26 by using a vehicular model. This will be explained with reference to FIG. 8. Here, in an example of a screen view 31, the subject vehicle is shown by a vehicular model 311, while the oncoming vehicle is shown by a vehicular model 313. Here, the vehicular model is formed using a shape of a vehicle (i.e., in this embodiment, an outline of a top view of a vehicle, or a bird's-eye view of a vehicle). The positional relationship between both the vehicles, e.g., a distance between both the vehicles, is thereby recognized.

Back to FIG. 2, at Step S160, it is determined whether the driver performs an operation indicating stop using the operating switch group 22 or the remote controller 23a. Otherwise, the sequence branches by whether a vehicle speed is a given speed (e.g., 20 km/h) or more. Here, when the vehicle travels at the given speed or more, the driver may estimate that the oncoming vehicle can be securely passed. In this case, displaying above the positional relationship may become useless or offensive to the driver, so that displaying it should be cancelled. When the driver is determined to perform an operation or when a vehicle speed is determined to be a given speed or more, the displaying process 1 ends. In contrast, when the driver is determined not to perform an operation or when a vehicle speed is determined not to be a given speed or more the sequence returns to Step S120.

At Step S170, an effect that the positional relationship cannot be displayed since communicating with the oncoming vehicle is impossible is notified by displaying it on the display unit 26. The displaying process 1 then ends.

In the above, at Steps 140, 150, whether a common object is present in both of the image obtained from the front monitor camera 132 and the image obtained from the oncoming vehicle is determined. Further, when the common object is determined to be present, the positional relationship between the two vehicles is computed based on the common object. However, without the common object, the positional relationship can be computed. For instance, when an image by the front monitor camera 132 includes an oncoming vehicle, a position of the oncoming vehicle is computed based on the position of the subject vehicle. Further, when the image obtained from the oncoming vehicle includes the subject vehicle, a position of the subject vehicle is computed based on the position of the oncoming vehicle. Thereby, the positional relationship is computed from the positions of the vehicles.

Figure 3:
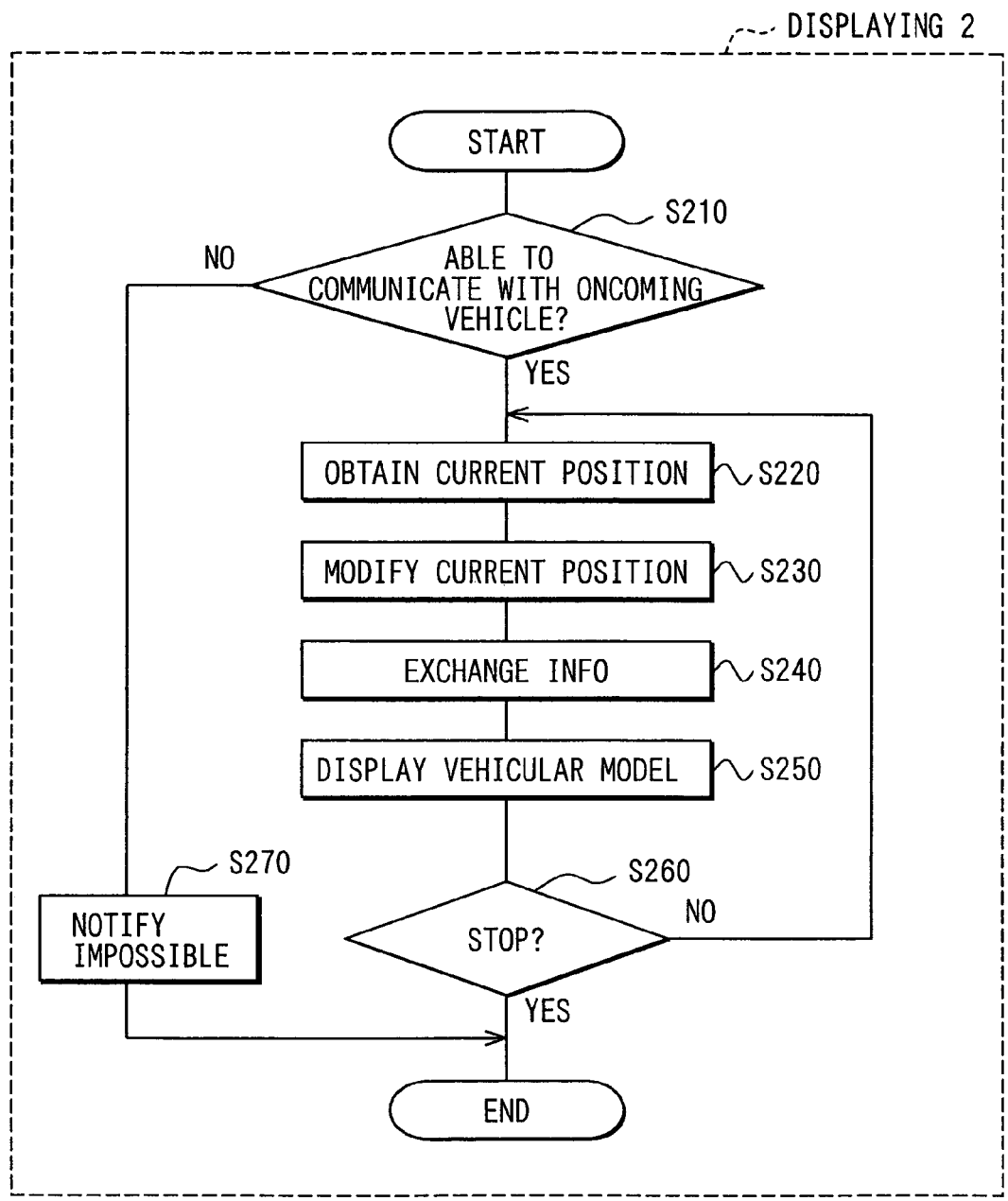
FIG. 3 is a flowchart diagram of a displaying process 2.

2) Displaying Process 2 (Refer to FIG. 3)

A displaying process 2 is started by the control unit 29 when a driver instructs by operating the operating switch group 22 or the remote controller 23a.

At Step S210, it is determined whether communicating with an oncoming vehicle is possible. This step determines whether the control unit 29 in the navigation device 20 is able to communicate with a comparable navigation device mounted in an oncoming vehicle via the inter-vehicle communications device 131 in the subject vehicle. When communication with an oncoming vehicle is possible, the sequence goes to Step S220. When impossible, the sequence goes to Step S270.

At Step S220, a current position (e.g., longitude and latitude) is computed based on signals from the position detector 21. Here, it is preferable that the current position information has higher accuracy than that used for a usual route guiding, so the current position is preferably computed by using RTK-GPS method.

At Step S230, the computed current position is modified to meet a central position of the vehicle. Namely, since the computed current position corresponds to a current position of the GPS antenna, the central position of the vehicle is obtained from this current position of the GPS antenna.

At Step S240, information of the current position of the subject vehicle and information of the vehicle's advancing direction are sent to the oncoming vehicle, while comparable information is received from the oncoming vehicle. Namely, this comparable information includes information of a current position of the oncoming vehicle and information of the oncoming-vehicle's advancing direction.

At Step S250, a positional relationship between the subject vehicle and the oncoming vehicle is computed based on the modified information of the current position and the advancing direction of the subject vehicle and the current position and the advancing direction of the oncoming vehicle; then, the computed positional relationship is shown in the display unit 26 by using a vehicular model. This will be explained with reference to FIG. 9A. Here, in an example of a screen view 32, the subject vehicle is shown by a vehicular model 321, while the oncoming vehicle is shown by a vehicular model 323. The positional relationship between both the vehicles, e.g., a distance between both the vehicles, is thereby recognized. Further, a display scale 325 (1/50) is shown in the right upper portion of FIG. 9A. A vehicular model used in displaying can be obtained from the navigation device 20. Namely, the navigation device 20 previously includes a vehicular model database with respect to each vehicle type. Here, the vehicular model of the oncoming vehicle can be retrieved from the vehicular model database by using vehicle type information of the oncoming vehicle obtained when communicating with the oncoming vehicle. Further, a navigation device of the oncoming vehicle can include vehicular model information and additionally send it to the subject vehicle. In this case, the navigation device 20 of the subject vehicle can display the vehicular model of the oncoming vehicle based on the sent information.

Back to FIG. 3, at Step S260, it is determined whether the driver performs an operation indicating stop using the operating switch group 22 or the remote controller 23a. Otherwise, the sequence branches by whether a vehicle speed is a given speed (e.g., 20 km/h) or more. When the driver is determined to perform an operation or when a vehicle speed is determined to be a given speed or more, the displaying process 2 ends. In contrast, when the driver is determined not to perform an operation or when a vehicle speed is determined not to be a given speed or more, the sequence returns to Step S220.

At Step S270, an effect that the positional relationship cannot be displayed since communicating with the oncoming vehicle is impossible is notified by displaying it on the display unit 26. The displaying process 2 then ends.

Further, when the determination is negated at Step S260, Steps S220 to S250 are repeated. Here, it is supposed that the subject vehicle approaches the oncoming vehicle more closely; therefore, at Step S250, as shown in FIG. 9B, the display scale (1/25) is decreased from that of FIG. 9A so that a vehicular model 331 of the subject vehicle and a vehicular model 333 of the oncoming vehicle are enlarged from the vehicular model 321 and the vehicular model 323, respectively.

Further, when a distance between the subject vehicle and the oncoming vehicle is a given distance or more within a region where the inter-vehicle communications device 131 can communicate with the remote inter-vehicle communications device in the oncoming vehicle, the positional relationship can be shown without the vehicular models including shapes of the vehicles. Namely, the positions of both the two vehicles can be shown by a conventional simple positioning marker or a rectangular frame line (or an oblong sign).

Furthermore, when a distance between the two vehicles is not less than, e.g., 200 m, an effect that a distance is too large to display vehicular models can be notified the driver by displaying it without displaying of the positional relationship.

Figure 4:
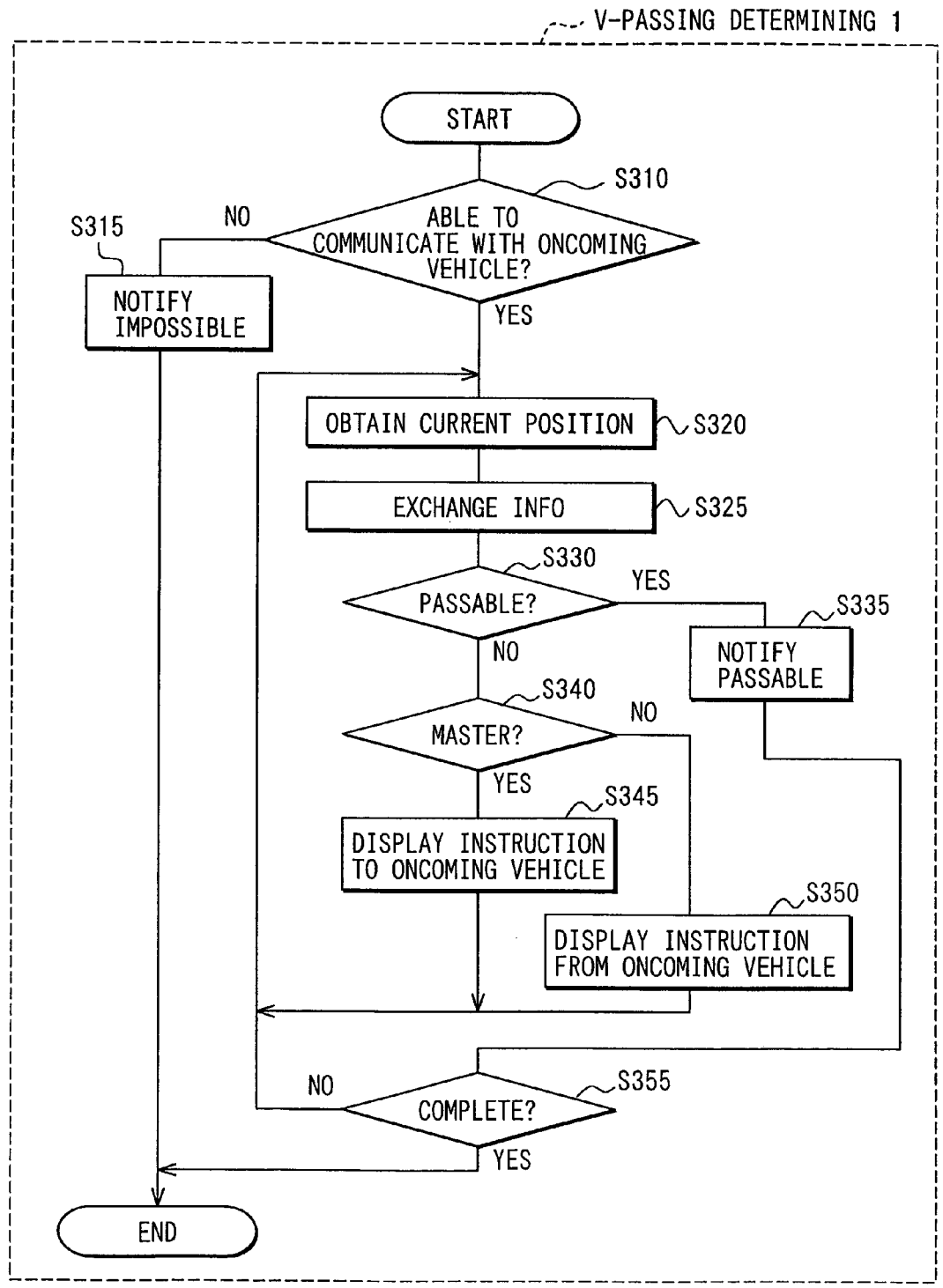
FIG. 4 is a flowchart diagram of a vehicle-passing determining process 1.

3) Vehicle-passing determining Process 1 (Refer to FIG. 4)

A vehicle-passing determining process 1 is started by the control unit 29 when a driver instructs by operating the operating switch group 22 or the remote controller 23a.

At Step S310, it is determined whether communicating with an oncoming vehicle is possible. This step determines whether the control unit 29 in the navigation device 20 is able to communicate with a comparable navigation device mounted in an oncoming vehicle via the inter-vehicle communications device 131 in the subject vehicle. When communication with an oncoming vehicle is possible, the sequence goes to Step S320. When impossible, the sequence goes to Step S315.

At Step S320, a current position (e.g., longitude and latitude) is computed based on signals from the position detector 21. Here, it is preferable that the current position information has higher accuracy than that used for a usual route guiding, so the current position is preferably computed by using RTK-GPS method.

Figure 13:
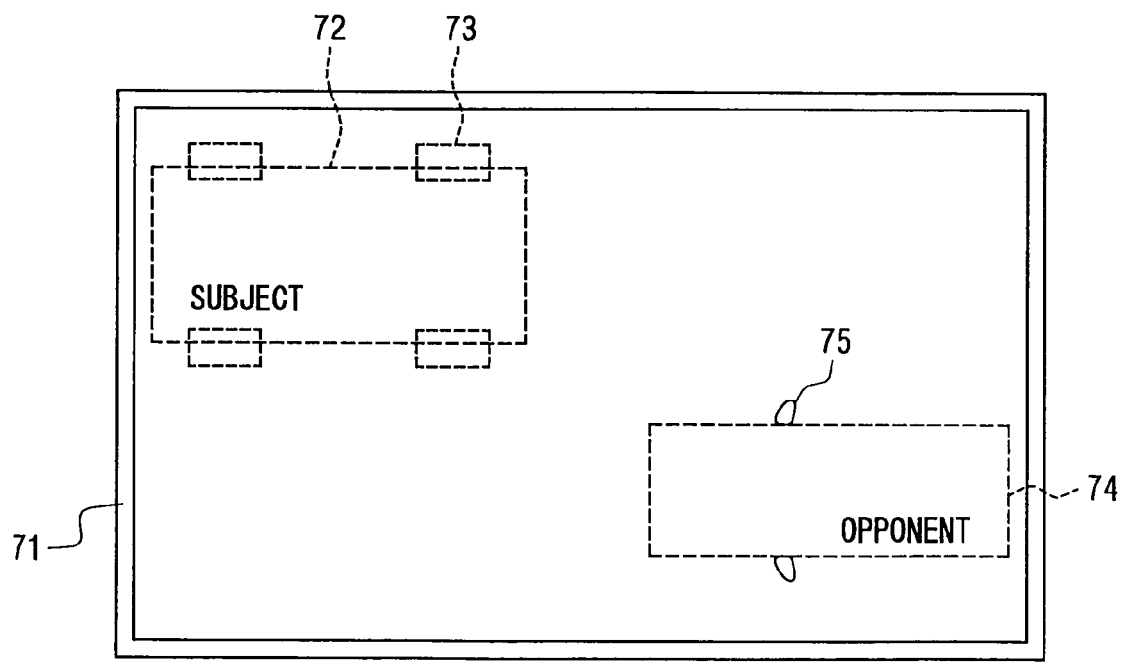
FIG. 13 is a view explaining a drawing method for a displayed object.

At Step S325, information of the current position of the subject vehicle and information of a vehicle's size are sent to the oncoming vehicle, while comparable information is received from the oncoming vehicle. Namely, this comparable information includes information of a current position of the oncoming vehicle and information of a size of the oncoming vehicle. Here, the information of the vehicle's size includes a length and width of the vehicle, a size of a protruding portion such as a door mirror or an over-fender, further whether a door mirror is opened or closed. Here, when a movement instruction (to be described later) is given, it is preferable that this information of the vehicle's size is used for drawing a vehicular model. Namely, the vehicular model corresponding to the length and width of the vehicle body can additionally include the components such as a door mirror or another accessory (such as an over-fender and a spoiler) attached to the body after being marketed (after shipment from a factory) so as to be able to draw a highly accurate vehicular model. In detail, as shown in a screen view 71 in FIG. 13, when a vehicular model is rectangular, over-fender objects 73 and door-mirror objects 75 are drawn in addition to body objects 72, 74.

Figure 14:
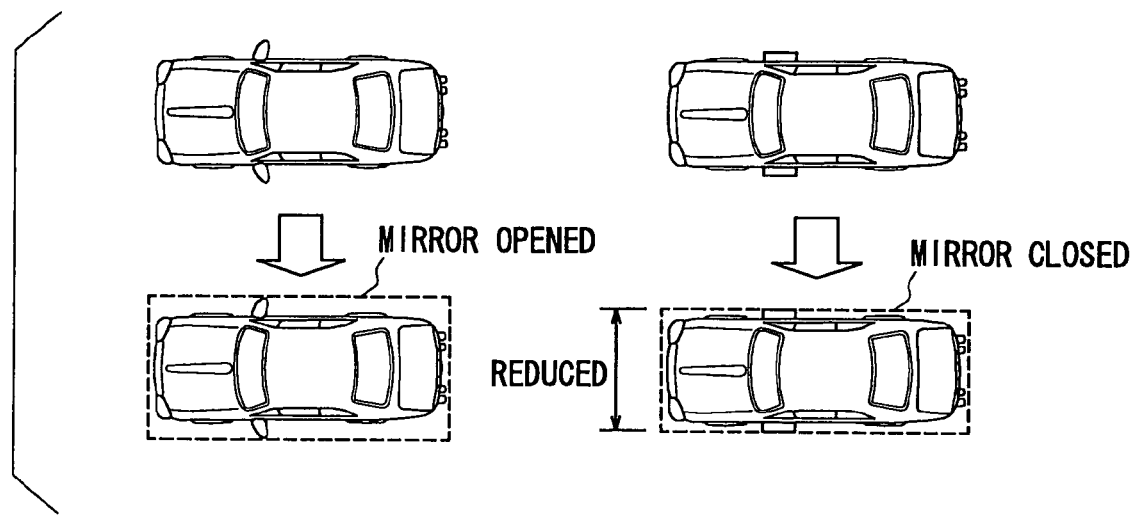
FIG. 14 is a view explaining a drawing method for a displayed object.

Further, the size of the vehicular model corresponding to the length and width of the vehicle body can be displayed by changing it based on a state of the door mirror or another accessory attached to the body. In detail, as shown in FIG. 14, a width side of a rectangular frame line surrounding the vehicular model can be changed by whether the door mirror is opened (or expanded) or closed (or housed).

Further, with respect to a vehicular model used in displaying, as explained at Step S250 in FIG. 3, the navigation device 20 can previously include a vehicular model database with respect to each vehicle type. Here, the vehicular model of the oncoming vehicle can be retrieved from the vehicular model database by using vehicle type information of the oncoming vehicle obtained when communicating with the oncoming vehicle. Further, a navigation device of the oncoming vehicle can include vehicular model information and additionally send it to the subject vehicle. In this case, the navigation device 20 of the subject vehicle can display the vehicular model of the oncoming vehicle based on the sent information.

At Step S330, it is determined whether both the vehicles are passable (or whether the subject vehicle is able to pass the oncoming vehicle) if both stay in the advance, based on the information of the current positions and the information of the vehicles' sizes. When both vehicles are determined to be passable, the sequence goes to Step S335. When determined to be impassable, the sequence goes to Step S 340.

At Step S335, an effect that both vehicles are passable is notified by displaying it on the display unit 26. The sequence then goes to Step S355.

Figure 10A:
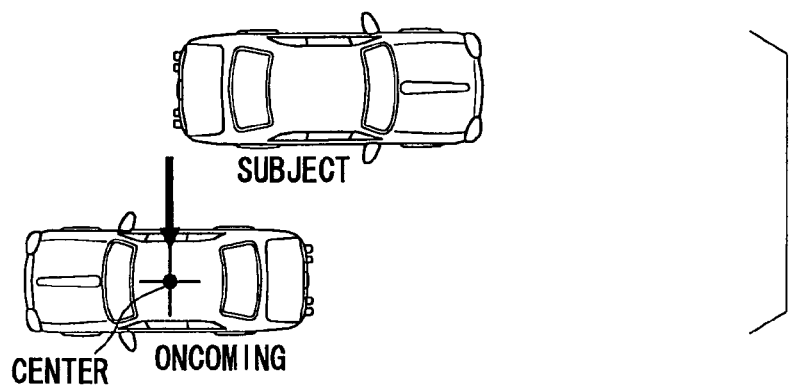
FIGS. 10A to 10C are views explaining determination of vehicle-passing.
Figure 10B:
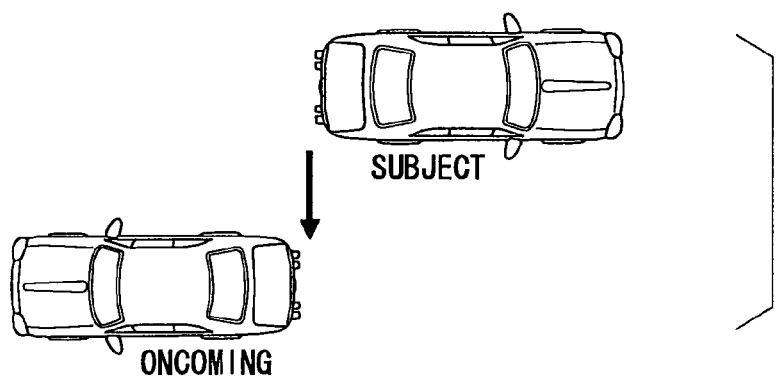
Figure 10C:
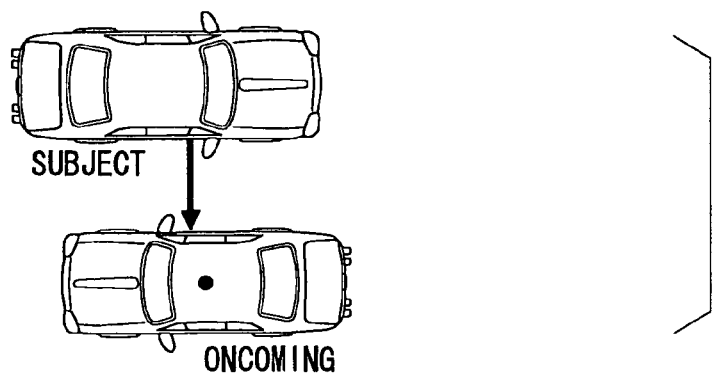

At Step S355, the sequence branches by whether vehicles' passing is complete (or whether both the vehicles completely pass each other). When vehicles' passing is complete, the vehicle-passing determining process 1 ends. When vehicles' passing is not complete, the sequence returns to Step S320. Whether vehicles' passing is complete is determined by the following timings. For instance, it is when the rear end of the subject vehicle passes the center of the oncoming vehicle, as shown in FIG. 10A. It is when the rear end of the subject vehicle passes the rear end of the oncoming vehicle, as shown in FIG. 10B. It is when the most protruding portion (door mirror or over-fender) of the subject vehicle passes the most protruding portion of the oncoming vehicle, as shown in FIG. 10C.

In contrast, at Step S340, it is determined whether the subject vehicle is a master. Whether the subject vehicle is a master or a slave is determined when it is determined whether communicating with the oncoming vehicle is possible at Step S310. In detail, a master is assigned to a vehicle such as a heavy vehicle or a parked vehicle that has a difficulty or no capability in traveling accurately or finely. When the subject vehicle is a master, the sequence goes to Step S345. When the subject vehicle is not a master (i.e., the subject vehicle is a slave), the sequence goes to Step S350.

At Step S345, a movement instruction is outputted to the oncoming vehicle and the movement instruction is shown in the display unit 26. The sequence then returns to Step S320.

Figure 11A:
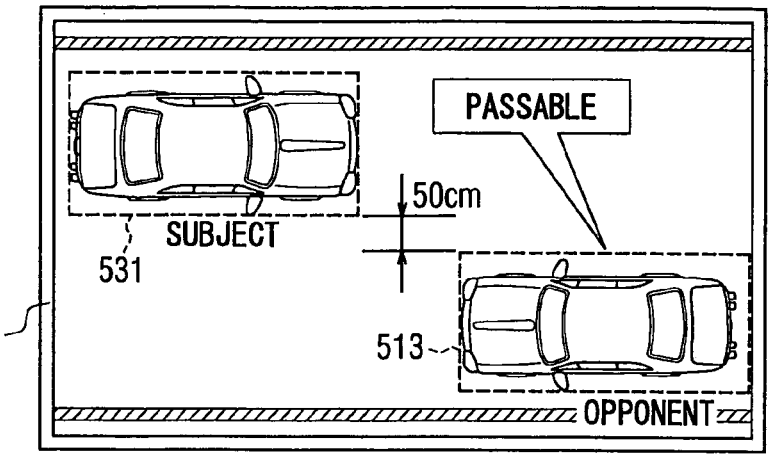
FIGS. 11A to 11C are examples of a screen view shown in a display unit.

The movement instruction will be explained with reference to FIGS. 11A, 11B, 11C. In a screen view 51 in FIG. 11A, the subject vehicle is drawn by a vehicular model 511, while the oncoming vehicle is drawn by a vehicular model 513. The vehicular models 511, 513 are surrounded by frames of dotted lines. A departing degree of the both frames in the vehicle's width direction is shown in a numeral (50 cm in FIG. 11A). Further, "passable" is also shown in the screen view 51. The size of the vehicle frame is changed based on the state where a door mirror is opened or closed.

Figure 11B:
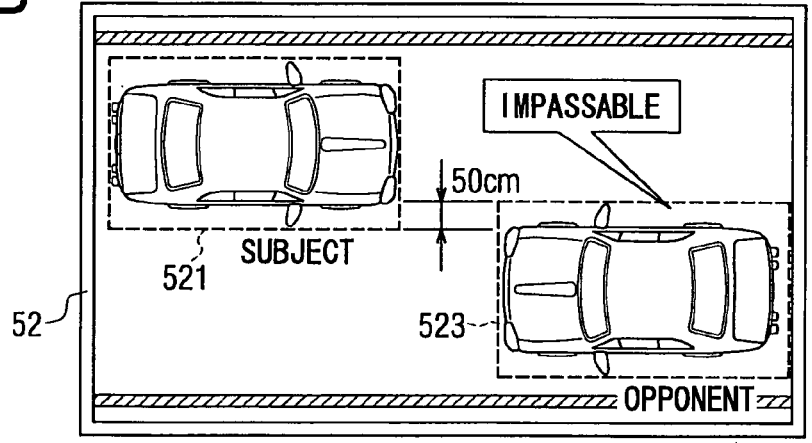

In a screen view 52 in FIG. 11B, the subject vehicle is drawn by a vehicular model 521, while the oncoming vehicle is drawn by a vehicular model 523. The vehicular models 521, 523 are surrounded by frames of dotted lines. An overlapping degree of the both frames in the vehicle's width direction is shown in a numeral (50 cm in FIG. 11B). Further, "impassable" is also shown in the screen view 52.

Figure 11C:
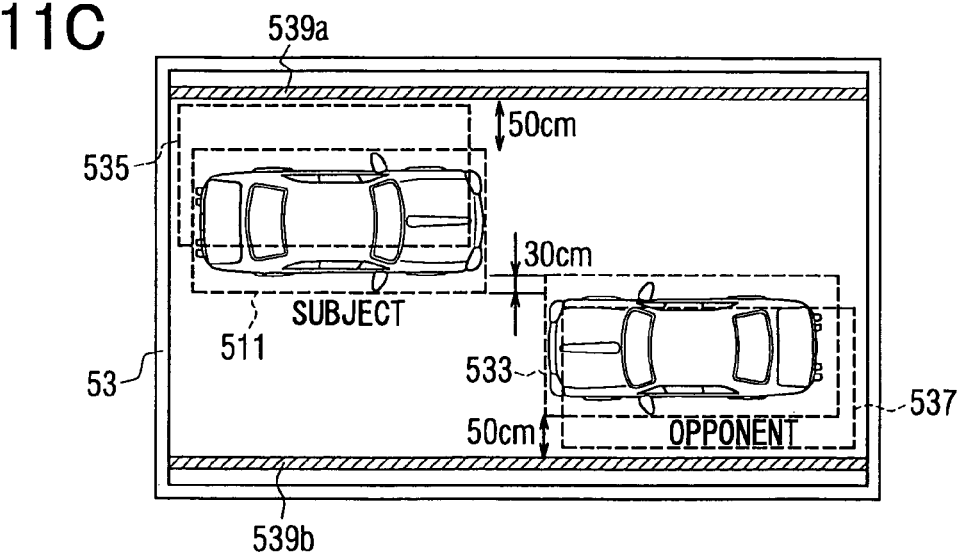

In a screen view 53 in FIG. 11C, the subject vehicle is drawn by a vehicular model 531, while the oncoming vehicle is drawn by a vehicular model 533. The vehicular models 531, 533 are surrounded by frames of dotted lines. An overlapping degree of the both frames in the vehicle's width direction is shown in a numeral (30 cm in FIG. 11C). Further, a distance (50 cm in FIG. 11C) from the vehicular model 531 to a wall 539a and a distance (30 cm in FIG. 11C) from the vehicular model 533 to a wall 539b are shown in the screen view 53. Further, frames 535, 537 are shown. If the individual vehicles move to these frames 535, 537, both vehicles can become passable with each other.

Figure 5:
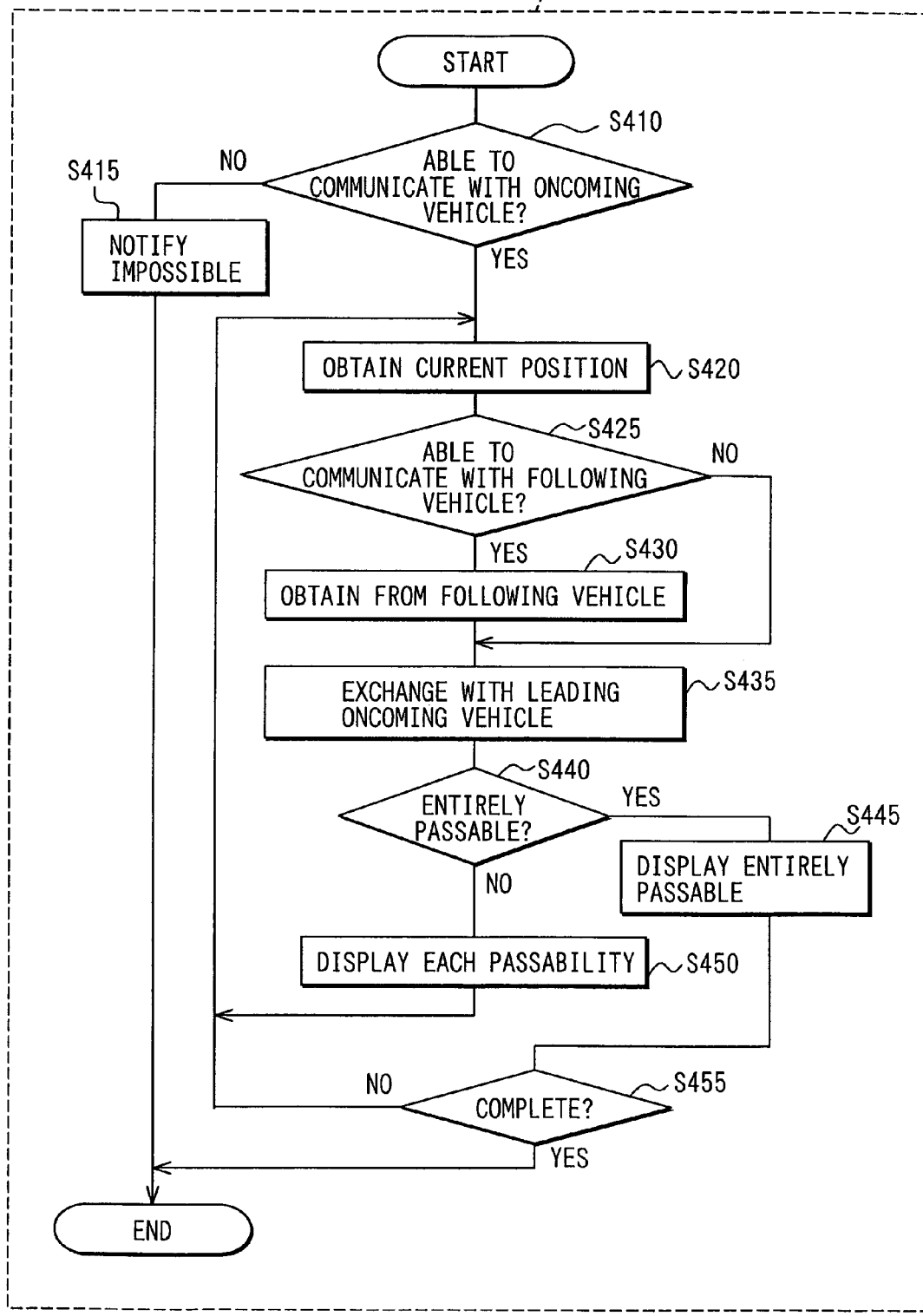
FIG. 5 is a flowchart diagram of a vehicle-passing determining process 2.

4) Vehicle-passing Determining Process 2 (Refer to FIG. 5)

A vehicle-passing determining process 2 is started by the control unit 29 when a driver instructs by operating the operating switch group 22 or the remote controller 23a.

At Step S410, it is determined whether communicating with an oncoming vehicle is possible. This step determines whether the control unit 29 in the navigation device 20 is able to communicate with a comparable navigation device mounted in an oncoming vehicle via the inter-vehicle communications device 131 in the subject vehicle. When communication with an oncoming vehicle is possible, the sequence goes to Step S420. When impossible, the sequence goes to Step S415.

At Step S420, a current position (e.g., longitude and latitude) is computed based on signals from the position detector 21. Here, it is preferable that the current position information has higher accuracy than that used for a usual route guiding, so the current position is preferably computed by using RTK-GPS method.

At Step S425, it is determined whether communicating with a following vehicle that follows the subject vehicle is possible. This step determines whether the control unit 29 in the navigation device 20 is able to communicate with a comparable navigation device mounted in the following vehicle via the inter-vehicle communications device 131 in the subject vehicle. When communication with the following vehicle is possible, the sequence goes to Step S430. When impossible, the sequence goes to Step S435.

At Step S430, information of a current position and size of the following vehicle are obtained from the following vehicle. Here, the information of the vehicle's size includes a length, a width, or the like.

At Step S435, information of the current position and size of the subject vehicle and information of the current position and size of the following vehicle (if it is obtained at Step S430) are sent to the oncoming vehicle. Comparable information is received from the leading oncoming vehicle. This comparable information includes information of a current position and size of the leading oncoming vehicle and information of a current position and size of an oncoming vehicle that follows the leading oncoming vehicle (as long as the inter-communications device 131 of the subject vehicle can obtain it).

At Step S440, the sequence branches by whether the subject vehicle can pass the leading oncoming vehicle and, further, the oncoming vehicle that follows the leading oncoming vehicle (hereinafter, the following oncoming vehicle). Here, it is an assumption that the information of the current positions or the like of both of the leading oncoming vehicle and the following oncoming vehicle have been securely obtained. When the subject vehicle can pass all of the leading oncoming vehicle and the following oncoming vehicle (or whether the subject vehicle is entirely passable with all the oncoming vehicles), the sequence goes to Step S445. When the subject vehicle cannot pass all of the leading oncoming vehicle and the following oncoming vehicle, the sequence goes to Step S450.

At Step S445, an effect that the subject vehicle can pass all of the oncoming vehicles is notified by displaying it using vehicular models on the display unit 26.

At Step S455, the sequence branches by whether vehicles' passing is complete (or whether the subject vehicle passes all of the oncoming vehicles completely). When vehicles' passing is complete, the vehicle-passing determining process 2 ends. When vehicles' passing is not complete, the sequence returns to Step S420. Whether vehicles' passing is complete is determined by the same manner (Step S355 in FIG. 4) as in the vehicle-passing determining process 1.

In contrast, at Step S450, whether the subject vehicle can pass each of the oncoming vehicles is displayed on the display unit 26. The sequence returns to Step S420.

Figure 12:
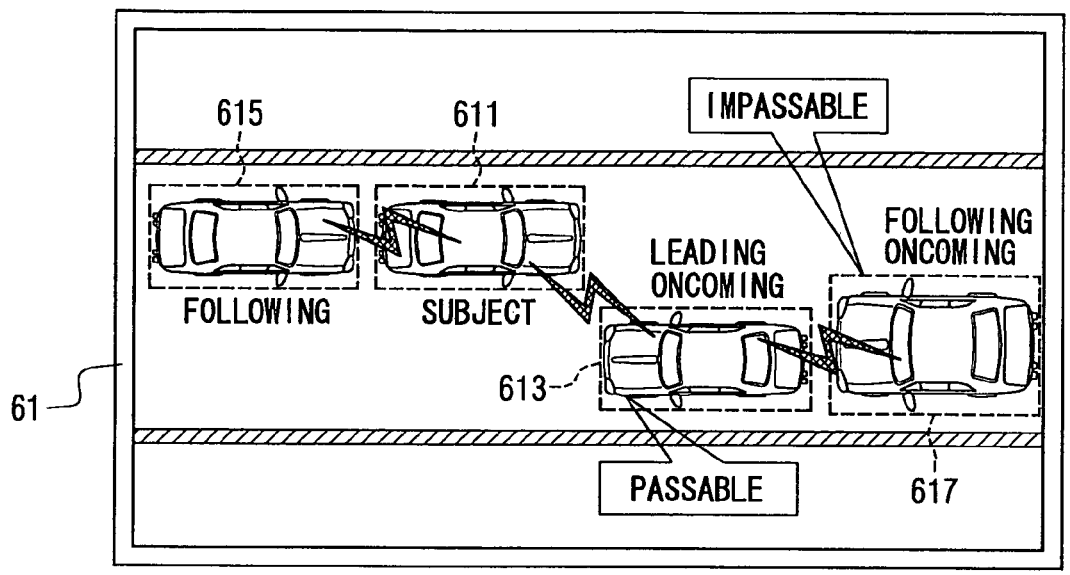
FIG. 12 is an example of a screen view shown in a display unit.

Here, screen views will be explained with reference to FIG. 12. In a screen view 61 in FIG. 12, the subject vehicle is drawn by a vehicular model 611; the following vehicle is drawn by a vehicular model 615; the leading oncoming vehicle is drawn by a vehicular model 613; and the following oncoming vehicle is drawn by a vehicular model 617. This screen view 61 shows that the subject vehicle can pass the leading oncoming vehicle but cannot pass the following oncoming vehicle, by using characters or texts.

Further, suppose a case where communicating with the leading oncoming vehicle is impossible but communicating with the following oncoming vehicle is possible. In this case, the current position information of the leading oncoming vehicle can be computed based on the image of the leading oncoming vehicle photographed by the following oncoming vehicle. By using the computed current position information of the leading oncoming vehicle, it can be determined whether the subject vehicle can pass the leading oncoming vehicle.

Further, suppose that the following vehicle has no navigation device comparable to the navigation device 20 of the subject vehicle. In this case, the current position information of the following vehicle can be computed based on the image of the following vehicle photographed by the rear monitor camera 133 of the subject vehicle. The computed current position information of the following vehicle can be sent to the leading oncoming vehicle.

Figure 6:
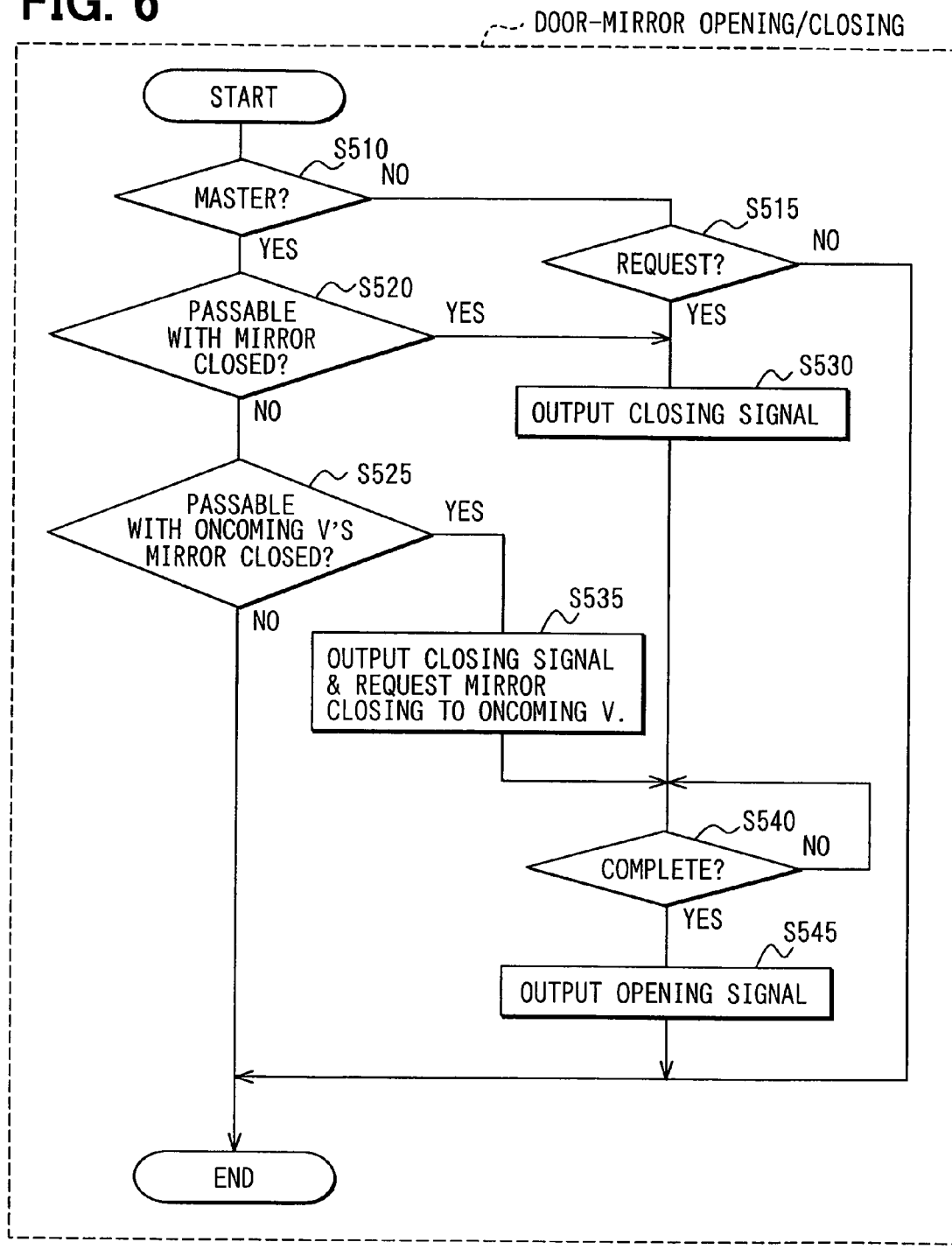
FIG. 6 is a flowchart diagram of a door-mirror opening/closing process.

5) Door-Mirror Opening/Closing Process (Refer to FIG. 6)

A door-mirror opening/closing process is started in conjunction when vehicles' passing is determined to be impossible in the vehicle-passing determining processes 1, 2 (i.e., at Step S330 in FIG. 4: NO, at Step S440 in FIG. 5: NO). The control unit 29 performs the vehicle-passing determining process 1, 2 and the door-mirror opening/closing process at the same time.

At Step S510, the sequence branches by whether the subject vehicle is a master. Whether the subject vehicle is a master or a slave is determined when it is determined whether communicating with the oncoming vehicle is possible at Step S310 in FIG. 4 or Step S410 in FIG. 5. When the subject vehicle is a master, the sequence goes to Step S520. When the subject vehicle is not a master (i.e., the subject vehicle is a slave), the sequence goes to Step S515.

At Step S520, it is determined whether closing a door mirror of the subject vehicle enables passing. This determination uses a manner similar to those in the above vehicle-passing determining processes 1, 2. When closing the door mirror enables passing, the sequence goes to Step S530. When closing the door mirror does not enable passing, the sequence goes to Step S525.

At Step S525, it is determined whether closing a door mirror of the oncoming vehicle in addition to that of the subject vehicle enables passing. This determination also uses a manner similar to those in the above vehicle-passing determining processes 1, 2. When closing the door mirrors of both the vehicles enables passing each other, the sequence goes to Step S535. When closing the door mirrors of the two vehicles does not enable passing, the door-mirror opening/closing process ends.

At Step S535, a signal for closing the door mirror of the subject vehicle is outputted via the in-vehicle LAN communications unit 30 to the in-vehicle LAN 134, while request for closing the door mirror of the oncoming vehicle is sent via the inter-vehicle communications device 131 to the oncoming vehicle. The sequence then goes to Step S540.

At Step S515, it is determined whether a request is received from the oncoming vehicle. When a request is received, the sequence goes to Step S530. When a request is not received, the door mirror opening/closing process ends.

At Step S530, a signal for closing the door mirror of the subject vehicle is outputted to the in-vehicle LAN 134 via the in-vehicle LAN communications unit 30. The sequence then goes to Step S540.

At Step S540, it is determined whether the subject vehicle passes all the relevant vehicles completely. When the subject vehicle passes all the relevant vehicles completely, the sequence goes to Step S545. When the subject vehicle does not pass all the relevant vehicles completely, the sequence stays in Step S540. Here, this determination uses a method similar to those at Step S355 in FIG. 4, and Step S455 in FIG. 5, in the vehicle-passing determining processes 1, 2.

At Step S545, a signal for opening the door mirror of the subject vehicle is sent to the in-vehicle LAN 134 via the in-vehicle LAN communications unit 30, and then the process ends.

Figure 7:
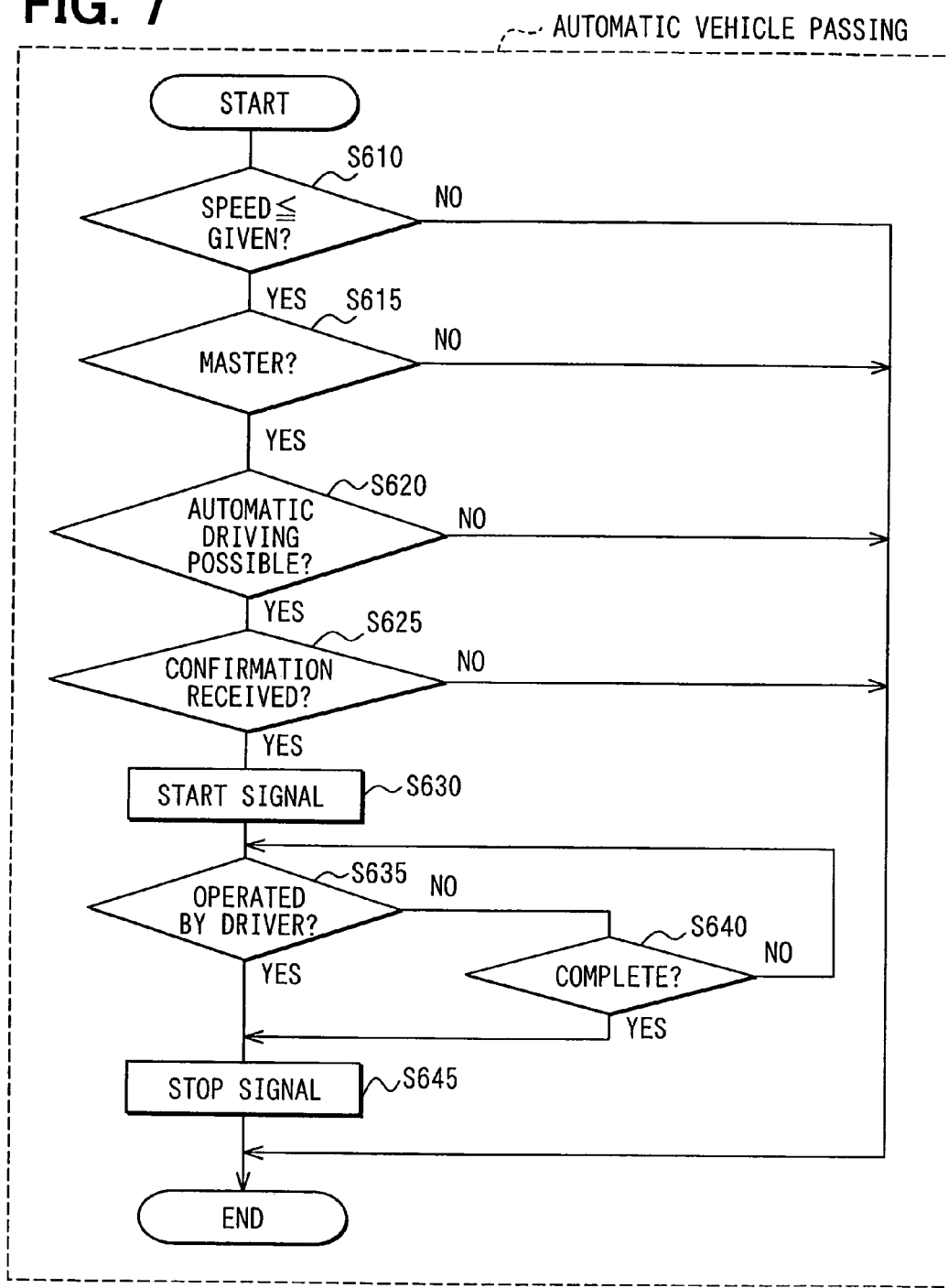
FIG. 7 is a flowchart diagram of an automatic vehicle-passing process.

6) Automatic Vehicle Passing Process (Refer to FIG. 7)

An automatic vehicle passing process is started when a driver instructs by operating the operating switch group 22 or the remote controller 23a after vehicles' passing is determined to be possible in the vehicle-passing determining processes 1, 2 (i.e., at Step S330 in FIG. 4: YES, at Step S440 in FIG. 5: YES). The control unit 29 performs the vehicle-passing determining process 1, 2 and the automatic vehicle-passing process at the same time.

At Step S610, it is determined whether a speed of the subject vehicle is a given speed or less. This speed is obtained from the engine ECU or the like via the in-vehicle LAN 134. The given speed means a reduced speed (favorably, e.g., 10 to 20 km/h). When a speed is the given speed or less, the sequence goes to Step S615. When a speed is not the given speed or less, this process ends.

At Step S615, the sequence branches by whether the subject vehicle is a master. Whether the subject vehicle is a master or a slave is determined when it is determined whether communicating with the oncoming vehicle is possible at Step S310 in FIG. 4 or Step S410 in FIG. 5. When the subject vehicle is a master, the sequence goes to Step S620. When the subject vehicle is not a master (i.e., the subject vehicle is a slave), this process ends.

At Step S620, it is determined whether a safe automatic driving is possible by obtaining information around the subject vehicle. This information around the subject vehicle is based on the image photographed by the front monitor camera 132. When a safe automatic driving is determined to be possible, the sequence goes to Step S625. When a safe automatic driving is determined not to be possible, the process ends.

At Step S625, it is determined whether confirmation for the automatic driving is received from the driver. Here, a message whether an automatic driving should be started is displayed on the display unit 26. When the driver permits the automatic driving by operating the operating switch group 22 or the remote controller 23a, the sequence goes to Step S630. When the driver does not permit the automatic driving, the process ends.

At Step S630, the control unit 29 starts sending a signal necessary for an automatic vehicle-passing driving to the in-vehicle LAN 134 via the in-vehicle LAN communications unit 30. This signal includes a signal for controlling an automatic steering actuator that operates a steering wheel instead of the driver, a signal for controlling an engine throttle, and a signal for controlling an automatic braking system.

At Step S635, it is determined whether the driver conducts a driving operation. In detail, whether the driver operates the steering wheel, or whether the driver operates a braking system is determined. When the driver conducts a driving operation, the sequence goes to Step S645. When the driver does not conduct a driving operation, the sequence goes to Step S640.

At Step S640, it is determined whether vehicles' passing is complete. This determination is executed by the comparable manner (Step S355 in FIG. 4, Step S455 in FIG. 5) as in the vehicle-passing determining processes 1, 2. When vehicles' passing is determined to be complete, the sequence goes to Step S645. When vehicles' passing is determined not to be complete, the sequence returns to Step S635.

At Step S645, the signal necessary for the automatic vehicle passing driving is stopped. The process then ends.

Effects

According to the displaying processes 1, 2, a driver intuitively recognizes, by seeing the display unit 26, a positional relationship between the subject vehicle and an opponent vehicle that the subject vehicle passes. As a result, this helps prevent contact with the opponent vehicle or structures in road sides, or running off road sides by the subject vehicle.

According to the vehicle-passing determining processes 1, 2, a driver can omit determining of possibility of vehicles' passing, so the driver can focus on driving the vehicle.

According to the door mirror opening/closing process, a driver can focus on driving without needing to operate switching for opening and closing a door mirror.

According to the automatic vehicle passing process, a driver is relieved of a careful driving operation performed when the subject vehicle passes another vehicle.

(Others)

1) In Step S325 in the vehicle-passing determining process 1, information indicating that an opponent vehicle is being parked can be additionally exchanged. This enables the display unit 26 to indicate that the opponent vehicle is being parked. The driver can thereby recognize that the opponent vehicle is being parked without confirming that no person is present within the opponent vehicle.

2) A navigation device can be designed to be activated to reply to a request for sending of positional information from another certain navigation device provided in a certain vehicle while a relevant vehicle provided with this navigation device is being parked. In this case, when the relevant vehicle is parked, its current position (or parking position) is obtained and a control unit stores the obtained current position. Thereafter, the navigation device replies to a request from the certain navigation device; namely, the navigation device sends the parking position and parking information representing that the relevant vehicle is being parked. Further, power supply to portions not relating to this reply can be stopped while being parked. In this structure, a driver driving the certain vehicle can be assisted by the parking position and the parking information of the relevant vehicle without consuming much power of the relevant vehicle. Further, to prevent useless communications in an inter-vehicle communications device of a parked vehicle, the following operation can take place. Suppose a case where a request for sending a parking position is received from an approaching vehicle. In this case, at first, a relative distance with the approaching vehicle is computed. When the relative distance is determined to be 20 m or more, the navigation device of the parked vehicle does not reply even when the request is received. This structure enables the display unit of the approaching vehicle to display only necessary parked vehicles that are located closely excluding unnecessary parked vehicles that are not located closely.

Figure 9A:
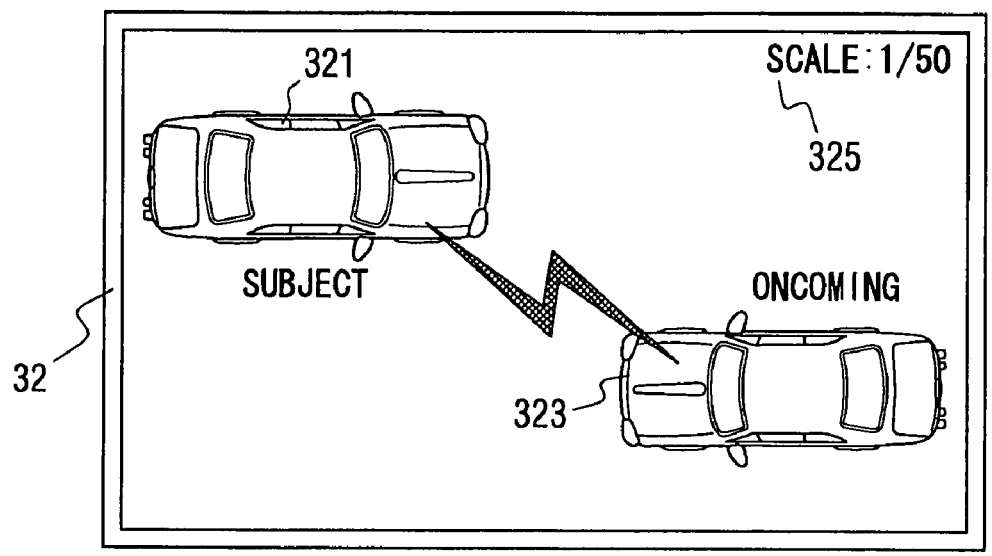
FIGS. 9A, 9B are examples of a screen view shown in a display unit.
Figure 9B:
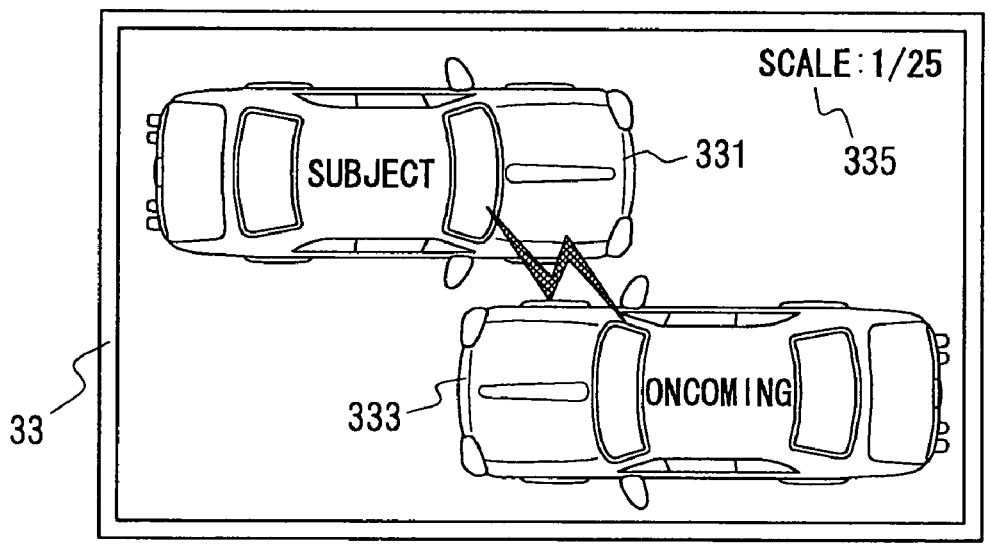
Figure 15A:
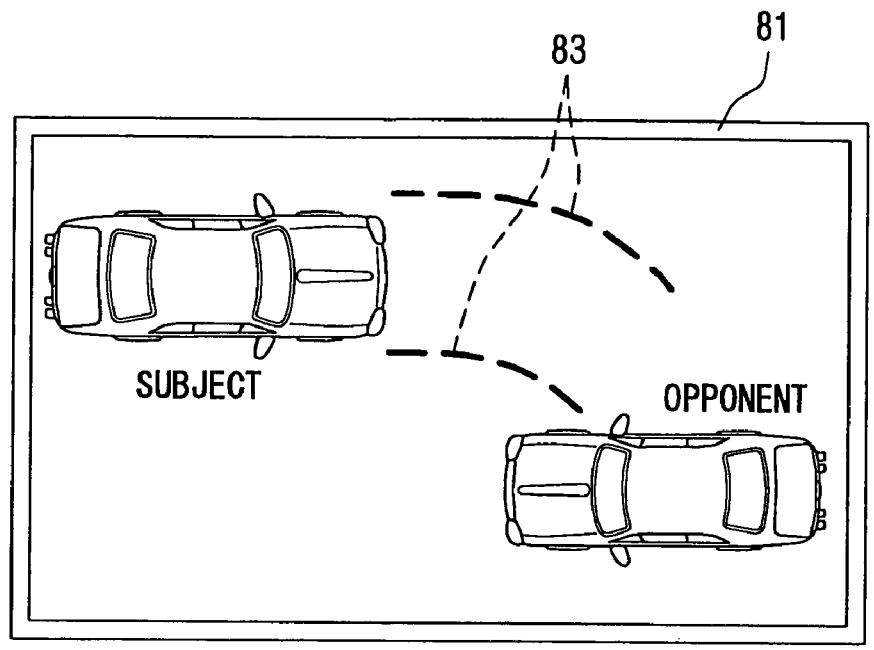
FIGS. 15A, 15B are examples of a screen view shown in a display unit.

3) In the above screen view 32 in FIG. 9A, a subject vehicle is shown by a vehicular model 321, an oncoming vehicle is shown by a vehicular model 323, and a positional relationship indicating a distance is also shown. However, this screen view 32 can further include an estimated traveling track. In detail, as shown in FIG. 15A, in a screen view 81, an estimated traveling track 83 of the subject vehicle can be shown. Here, this estimation is performed based on information from a steering angle sensor connecting to the in-vehicle LAN 134 via the in-vehicle LAN communications unit 30 or signals from the distance sensor 21.

This drawing enables the driver to recognize in what traveling track the subject vehicle advances with the current steering angle maintained to thereby intuitively recognize what positional relationship the subject vehicle and the opponent vehicle are to form.

Figure 15B:
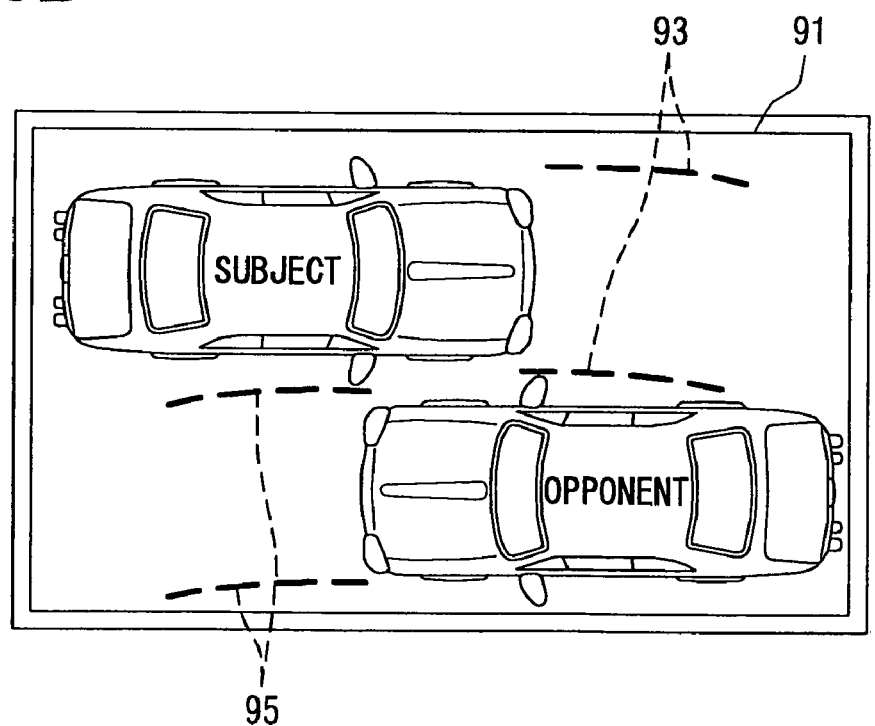

Further, not only the estimated traveling track of the subject vehicle, but also that of an opponent vehicle can be shown. In detail, as shown in FIG. 15B, in a screen view 91, an estimated traveling track 95 of the opponent vehicle is shown in addition to an estimated traveling track 93 of the subject vehicle. Here, when the positional information of the opponent vehicle is obtained (e.g., Step S240 in FIG. 3), a steering angle of the opponent vehicle can be obtained. Then, from the obtained steering angle, the estimated traveling track can be computed to be shown. Further, when the positional information of the opponent vehicle is obtained (e.g., Step S240 in FIG. 3), the estimated traveling track of the opponent vehicle can be directly obtained.

This enables the driver to recognize the estimated traveling track of the opponent vehicle in addition to that of the subject vehicle to thereby more accurately recognize what positional relationship the subject vehicle and the opponent vehicle are to form.

4) In the above screen views 31, 32, 33 (in FIGS. 8, 9), vehicular models for the subject vehicle and the opponent vehicle are shown to mainly indicate the relative positional relationship of the subject vehicle and the opponent vehicle. However, further, information of a road width or a position of a road side (e.g., a side ditch, or a side wall) can be shown at the same time. This enables the driver to confirm how close the subject vehicle can approach a road side, whether an opponent vehicle can be passed, or the like, so that smooth vehicles' passing can be achieved.

5) As a distance between a subject vehicle and an opponent vehicle becomes small, transmission power of the inter-vehicle communications device can be decreased. This can suppress power consumption of the inter-vehicle communications device and also helps prevent problems from radio-wave interference.

It will be obvious to those skilled in the art that various changes may be made in the above-described embodiments of the present invention. However, the scope of the present invention should be determined by the following claims.

What is claimed is:

1. A driving assistance system that is provided in a subject vehicle and communicates with at least one of remote driving assistance systems, the driving assistance system comprising:
    a detecting unit that detects a position of the subject vehicle and outputs positional information;
    a communicating unit that communicates with a remote driving assistance system;
    a displaying unit that displays various information; and
    a controlling unit that
        sends the positional information outputted by the detecting unit via the communicating unit to the remote driving assistance system,
        receives comparable positional information of a given vehicle that is provided with the remote driving assistance system via the communicating unit from the remote driving assistance system, and
        causes the displaying unit to display using a vehicular model a positional relationship between the subject vehicle and the given vehicle based on the positional information of the subject vehicle and the comparable positional information of the given vehicle, while the subject vehicle approaches and passes the given vehicle,
    wherein the vehicular model includes shapes of related vehicles relating to the positional information and the comparable positional information.

2. The driving assistance system of claim 1, wherein the vehicular model is formed using only outlines of top views of the related vehicles.

3. The driving assistance system of claim 1, wherein as a distance between the subject vehicle and the given vehicle becomes small, a contraction scale in which the vehicular model is displayed becomes large.

4. The driving assistance system of claim 1, wherein when a distance between the subject vehicle and the given vehicle is less than a given distance, the positional relationship is displayed by using the vehicular model.

5. The driving assistance system of claim 4, wherein, when a distance between the subject vehicle and the given vehicle is not less than the given distance, the positional relationship is displayed by using another vehicular model, which includes only positions of the related vehicles without including the shapes of the related vehicles.

6. The driving assistance system of claim 1, wherein the position of the subject vehicle is determined based on a reference point within the subject vehicle,
    wherein, when a position of the detecting unit is different from the reference point, the positional information detected by the detecting unit is modified into positional information that is estimated to be obtained using the reference point, and wherein the control unit sends the estimated positional information via the communicating unit.

7. The driving assistance system of claim 1,
wherein, when the subject vehicle is parked, the controlling unit memorizes positional information relating to a position where the subject vehicle is parked, and
wherein, when the remote driving assistance system requests transmission of positional information, the controlling unit sends the memorized positional information via the communicating unit to the remote driving assistance system.

8. The driving assistance system of claim 7,
wherein, when the subject vehicle is parked, the controlling unit memorizes parking information representing that the subject vehicle is being parked in addition to the positional information, and
wherein, when the remote driving assistance system requests the transmission, the controlling unit sends the memorized parking information along with the memorized positional information via the communicating unit to the remote driving assistance system.

9. The driving assistance system of claim 1,
wherein, the controlling unit
communicates with a certain remote driving assistance system provided in a certain vehicle following the subject vehicle via the communicating unit,
obtains certain positional information of the certain vehicle via the communicating unit from the certain remote driving assistance system, and
wherein the controlling unit
sends following-vehicle-considered positional information that includes the certain positional information in addition to the positional information of the subject vehicle via the communicating unit to the remote driving assistance system provided in the given vehicle, and
receives comparable following-vehicle-considered positional information via the communicating unit from the remote driving assistance system provided in the given vehicle, and
causes the displaying unit to display using the vehicular model a positional relationship among vehicles relating to the following-vehicle-considered positional information and the comparable following-vehicle-considered positional information, while the subject vehicle approaches and passes the given vehicle.

10. The driving assistance system of claim 1,
wherein the controlling unit
sends, additionally, size information relating to a size of the subject vehicle via the communicating unit to the remote driving assistance system,
receives, additionally, given size information relating to a size of the given vehicle via the communicating unit from the remote driving assistance system, and
uses the size information and the given size information for determining a size of the vehicular model.

11. A driving assistance system that is provided in a subject vehicle and communicates with at least one of remote driving assistance systems, the driving assistance system comprising:
an image outputting unit that photographs a surrounding area of the subject vehicle to thereby output an image;
a communicating unit that communicates with a remote driving assistance system;
a displaying unit that displays various information; and
a controlling unit that
sends the image outputted by the image outputting unit via the communicating unit to the remote driving assistance system,
receives a comparable image via the communicating unit from the remote driving assistance system, and
causes the displaying unit to display using a vehicular model a positional relationship between the subject vehicle and a given vehicle where the remote driving assistance system is provided based on the image and the comparable image, while the subject vehicle approaches and passes the given vehicle,
wherein the vehicular model includes shapes of related vehicles relating to the image and the comparable image.

12. The driving assistance system of claim 11,
wherein the vehicular model is formed using only outlines of top views of the related vehicles.

13. The driving assistance system of claim 11,
wherein the controlling unit
sends, additionally, size information relating to a size of the subject vehicle via the communicating unit to the remote driving assistance system,
receives, additionally, given size information relating to a size of the given vehicle via the communicating unit from the remote driving assistance system, and
uses the size information and the given size information for determining a size of the vehicular model.

14. The driving assistance system of claim 13, further comprising:
a road information obtaining unit that obtains road information including information relating to at least one of a road width and a position of a road side,
wherein the controlling unit further displays a road map based on the obtained road information in addition to the vehicular model.

15. The driving assistance system of claim 14,
wherein as a distance between the subject vehicle and the given vehicle becomes small, a contraction scale in which the vehicular model and the road map is displayed becomes large.

16. The driving assistance system of claim 14,
wherein the controlling unit
determines whether the subject vehicle is able to pass the given vehicle based on the size information, the given size information, and the obtained road information, and
causes the displaying unit to display a determination result.

17. The driving assistance system of claim 16,
wherein the controlling unit does not determine whether the subject vehicle is able to pass the given vehicle when a speed of the subject vehicle is a given speed or more.

18. The driving assistance system of claim 16,
wherein, when the controlling unit does not determine whether the subject vehicle is able to pass the given vehicle, the controlling unit determines whether the subject vehicle is able to pass the given vehicle with a door mirror of the subject vehicle closed, and
wherein, when it is determined that the subject vehicle is able to pass the given vehicle with the door mirror of the subject vehicle closed, the controlling unit outputs a signal to cause the door mirror to be closed.

19. The driving assistance system of claim 18,
wherein, when the subject vehicle completes passing the given vehicle after the controlling unit outputs the signal to cause the door mirror to be closed, the controlling unit outputs a signal to cause the door mirror to be opened.

20. The driving assistance system of claim 13,
wherein the controlling unit
obtains steering information of the subject vehicle,
estimates a traveling track of the subject vehicle based on the obtained steering information, and
causes the displaying unit to further display the estimated traveling track of the subject vehicle.

21. The driving assistance system of claim 20,
wherein the controlling unit
sends the obtained steering information to the remote driving assistance system,
receives comparable steering information,
estimates a traveling track of the given vehicle based on the comparable steering information, and
causes the displaying unit to further display the estimated traveling track of the given vehicle.

22. The driving assistance system of claim 13,
wherein the controlling unit
outputs at least one of steering information and advancing information, wherein the at least one is necessary for the subject vehicle to pass the given vehicle based on the road information and the positional relationship between the subject vehicle and the given vehicle.

23. A driving assistance system that is provided in a subject vehicle and communicates with at least one of remote driving assistance systems, the driving assistance system comprising:
a communicating unit that communicates with a given remote driving assistance system provided in a given vehicle;
an obtaining unit that obtains vehicle-related information relating to at least one of the subject vehicle and the given vehicle;
a displaying unit that displays various information; and
a controlling unit that
sends the obtained vehicle-related information via the communicating unit to the given remote driving assistance system,
receives comparable vehicle-related information via the communicating unit from the given remote driving assistance system, and
causes the displaying unit to display a positional relationship between related vehicles relating to the vehicle-related information and the comparable vehicle-related information, using a vehicular model that includes shapes of the related vehicles, based on the vehicle-related information and the comparable vehicle-related information, while the subject vehicle approaches and passes the given vehicle.

24. The driving assistance system of claim 23,
wherein the obtaining unit detects a position of the subject vehicle,
wherein the vehicle-related information includes a position of the subject vehicle, while the comparable vehicle-related information includes a position of the given vehicle.

25. The driving assistance system of claim 23,
wherein the obtaining unit photographs a surrounding area of the subject vehicle, and
wherein the vehicle-related information includes an image of the surrounding area of the subject vehicle while the comparable vehicle-related information includes an image of the surrounding area of the given vehicle.

26. The driving assistance system of claim 23,
wherein the vehicular model is formed using only outlines of top views of the related vehicles.

27. The driving assistance system of claim 23,
wherein, the controlling unit
communicates with a certain remote driving assistance system provided in a certain vehicle following the subject vehicle via the communicating unit,
obtains certain vehicle-related information via the communicating unit from the certain remote driving assistance system, and
wherein the controlling unit
sends following-vehicle-considered information that includes the certain vehicle-related information in addition to the vehicle-related information of the subject vehicle via the communicating unit to the given remote driving assistance system, and
receives comparable following-vehicle-considered information via the communicating unit from the given remote driving assistance system, and
causes the displaying unit to display using the vehicular model a positional relationship among vehicles relating to the following-vehicle-considered and the comparable following-vehicle-considered information, while the subject vehicle approaches and passes the given vehicle.

* * * * *

UNITED STATES PATENT AND TRADEMARK OFFICE
CERTIFICATE OF CORRECTION

PATENT NO. : 7,215,254 B2  Page 1 of 1
APPLICATION NO. : 11/105521
DATED : May 8, 2007
INVENTOR(S) : Nobutaka Tauchi It is certified that error appears in the above-identified patent and that said Letters Patent is hereby corrected as shown below:

Title page

Correct Item (30), as Foreign Application Priority Data:

Apr. 16, 2004  (JP) ........................... 2004-121745
Feb. 28, 2005  (JP) ........................... 2005-"53031"

Signed and Sealed this

Fourth Day of December, 2007

JON W. DUDAS
*Director of the United States Patent and Trademark Office*